US010958641B2

(12) United States Patent
Burmester et al.

(10) Patent No.: US 10,958,641 B2
(45) Date of Patent: Mar. 23, 2021

(54) CONTEXT-AWARE BIOMETRIC ACCESS CONTROL POLICIES (71) Applicant: International Business Machines Corporation, Armonk, NY (US)

(72) Inventors: Stephen Burmester, Ashgrove (AU); Trevor S. Norvill, Parkwood (AU); Craig A. Pearson, Varsity Lakes (AU)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 15/817,607

(22) Filed: Nov. 20, 2017

(65) Prior Publication Data
US 2019/0158491 A1 May 23, 2019

(51) Int. Cl.
*H04L 29/06* (2006.01)
(52) U.S. Cl.
CPC ........ *H04L 63/0861* (2013.01); *H04L 63/105* (2013.01); *H04L 2463/082* (2013.01)
(58) Field of Classification Search
None
See application file for complete search history.

(56) References Cited

U.S. PATENT DOCUMENTS

| | | | | |
|---|---|---|---|---|
| 6,038,315 A * | 3/2000 | Strait | ................... | H04L 9/0662 382/115 |
| 6,259,805 B1 * | 7/2001 | Freedman | .......... | G06K 9/00087 382/115 |
| 6,363,485 B1 * | 3/2002 | Adams | .................... | H04L 9/304 713/186 |
| 6,498,861 B1 * | 12/2002 | Hamid | ............... | G06K 9/00087 340/5.52 |
| 6,697,947 B1 * | 2/2004 | Matyas, Jr. | ........... | H04L 9/3231 380/282 |
| 6,735,695 B1 * | 5/2004 | Gopalakrishnan | ...... | G06F 21/32 713/186 |
| 6,778,688 B2 * | 8/2004 | Aggarwal | ............. | G06F 21/305 382/125 |

(Continued)

OTHER PUBLICATIONS

Lenc et al., "Confidence Measure for Automatic Face Recognition", Department of Computer Science and Engineering, University of West Bohemia, Plzen, Czech Republic, 4 pages, printed on Jun. 23, 2017.

(Continued)

*Primary Examiner* — Jeffery L Williams
(74) *Attorney, Agent, or Firm* — Michael A. Petrocelli (57) ABSTRACT

A context-aware biometric access control policy is provided. A request to access a protected resource received from a client device is identified. A resource hierarchy associates each of a plurality of protected resources with one or more respective confidence levels of authentication. A confidence level that is associated with the protected resource is identified based on the resource hierarchy. Instructions to capture a biometric token via the client device are generated based on a set of one or more confidence level parameters that is associated with the identified confidence level. The generated instructions are sent to the client device. A biometric token received from the client device is determined to authenticate the user of the client device and, in response, the request to access the protected resource is approved.

9 Claims, 4 Drawing Sheets (56) References Cited

U.S. PATENT DOCUMENTS

| | | | |
|---|---|---|---|
| 6,907,134 B1* | 6/2005 | Yamada | G06F 21/32 235/380 |
| 8,027,518 B2 | 9/2011 | Baker et al. | |
| 8,255,698 B2 | 8/2012 | Li et al. | |
| 8,590,018 B2 | 11/2013 | Thavasi et al. | |
| 9,100,825 B2 | 8/2015 | Schultz et al. | |
| 9,323,912 B2 | 4/2016 | Schultz et al. | |
| 2001/0027520 A1* | 10/2001 | Mori | G06Q 20/40 713/186 |
| 2001/0044900 A1* | 11/2001 | Uchida | G06F 21/32 713/186 |
| 2001/0049785 A1* | 12/2001 | Kawan | G06F 21/32 713/156 |
| 2002/0138743 A1* | 9/2002 | Murakami | G06K 9/00536 713/186 |
| 2002/0154793 A1* | 10/2002 | Hillhouse | G06K 9/00087 382/115 |
| 2002/0184538 A1* | 12/2002 | Sugimura | G06F 21/32 726/5 |
| 2004/0083394 A1 | 4/2004 | Brebner et al. | |
| 2007/0009139 A1* | 1/2007 | Landschaft | G06F 21/32 382/115 |
| 2010/0162386 A1* | 6/2010 | Li | G06F 21/32 726/19 |
| 2011/0153497 A1 | 6/2011 | Determan | |
| 2013/0247175 A1* | 9/2013 | Nechyba | G06F 21/32 726/19 |
| 2013/0336527 A1* | 12/2013 | Nechyba | G06K 9/00228 382/103 |
| 2015/0073985 A1* | 3/2015 | Hadinata | G06Q 20/40145 705/44 |
| 2015/0242840 A1 | 8/2015 | Kursun | |
| 2015/0363582 A1 | 12/2015 | Sheller et al. | |
| 2016/0063235 A1* | 3/2016 | Tussy | G06Q 20/40145 726/6 |
| 2016/0134609 A1 | 5/2016 | Durham et al. | |
| 2016/0147987 A1* | 5/2016 | Jang | G06F 21/32 726/19 |
| 2016/0255069 A1 | 9/2016 | Dickinson et al. | |
| 2017/0344793 A1* | 11/2017 | Xue | G06K 9/00906 |
| 2018/0181082 A1* | 6/2018 | Mitter | G05B 1/00 |
| 2019/0080070 A1* | 3/2019 | Van Os | G06F 21/32 |
| 2019/0080189 A1* | 3/2019 | Van Os | H04W 12/06 |
| 2019/0104968 A1 | 4/2019 | Fedele | |
| 2019/0158491 A1* | 5/2019 | Burmester | H04L 63/105 |
| 2019/0281051 A1* | 9/2019 | Burmester | H04L 63/105 |

OTHER PUBLICATIONS

Li et al., "Open World Face Recognition with Credibility and Confidence Measures", Department of Computer Science, George Mason University, Fairfax, VA 22030, © Springer-Verlag Berlin Heidelberg 2003, AVBPA 2003, LNCS 2688, pp. 462-469, 2003, 8 pages.

Burmester, et al., "Context-Aware Biometric Access Control Policies", U.S. Appl. No. 16/426,034, filed May 30, 2019.

List of IBM Patents or Patent Applications Treated as Related. Filed May 30, 2019. 2 pages.

* cited by examiner

CONTEXT-AWARE BIOMETRIC ACCESS CONTROL POLICIES

TECHNICAL FIELD

The present invention relates generally to the field of access control and, more particularly, to context-aware biometric access control policies.

BACKGROUND

Access control refers to the practice of restricting access to physical property (e.g., buildings and/or rooms) and/or virtual resources (e.g., virtual machines, applications, databases, and/or files) to authorized persons. Electronic access control utilizes electronic devices and software to grant or deny access to protected resources. In general, electronic access control authorizes access based upon presented credentials. Credentials can include something a person knows (e.g., a username and password), something they have, (e.g., access badge), something they are (e.g., biometric features), or a combination of these items. Electronic access control is advantageous because it provides a capability to distinguish one user from another and can provide a detailed record of attempted, denied, and granted attempts to access protected resource(s).

SUMMARY

According to one embodiment of the present invention, a method for executing a context-aware biometric access control policy is provided. The method includes: identifying a request to access a protected resource, wherein the request is received from a client device; identifying a confidence level that is associated with the protected resource based, at least in part, on a resource hierarchy, wherein the resource hierarchy associates each of a plurality of protected resources with one or more respective confidence levels for authentication; generating instructions to capture a biometric token via the client device based, at least in part, on a set of one or more confidence level parameters that is associated with the identified confidence level; sending the generated instructions to the client device; and determining that a biometric token received from the client device authenticates the user of the client device, and in response, approving the request to access the protected resource.

According to another embodiment of the present invention, a computer program product for executing a context-aware biometric access control policy is provided. The computer program product comprises a computer readable storage medium and program instructions stored on the computer readable storage medium. The program instructions include: program instructions to identify a request to access a protected resource, wherein the request is received from a client device; program instructions to identify a confidence level that is associated with the protected resource based, at least in part, on a resource hierarchy, wherein the resource hierarchy associates each of a plurality of protected resources with one or more respective confidence levels for authentication; program instructions to generate instructions to capture a biometric token via the client device based, at least in part, on a set of one or more confidence level parameters that is associated with the identified confidence level; program instructions to send the generated instructions to the client device; and program instructions to approve the request to access the protected resource in response to determining that a biometric token received from the client device authenticates the user of the client device.

According to another embodiment of the present invention, a computer system for executing a context-aware biometric access control policy is provided. The computer system includes one or more computer processors, one or more computer readable storage media, and program instructions stored on the computer readable storage media for execution by at least one of the one or more processors. The program instructions include: program instructions to identify a request to access a protected resource, wherein the request is received from a client device; program instructions to identify a confidence level that is associated with the protected resource based, at least in part, on a resource hierarchy, wherein the resource hierarchy associates each of a plurality of protected resources with one or more respective confidence levels for authentication; program instructions to generate instructions to capture a biometric token via the client device based, at least in part, on a set of one or more confidence level parameters that is associated with the identified confidence level; program instructions to send the generated instructions to the client device; and program instructions to approve the request to access the protected resource in response to determining that a biometric token received from the client device authenticates the user of the client device.

DETAILED DESCRIPTION

Embodiments of the present invention recognize that computer access control systems often utilize a common portal to manage access to many different types of protected resources. This practice is potentially disadvantageous in that the degree of authentication and security is the same for each type of protected resource while the protected resources may not be equally sensitive or valuable. For example, one type of resource may be highly sensitive or valuable, therefore warranting an authentication method with a high confidence level, while another type of resource may be less sensitive or valuable, therefore warranting an authentication method with a lower confidence level; in this situation, authentication at a single confidence level represents a non-optimal compromise between security and convenience. As used herein, "confidence level" refers to the ability of a computer system to verify that a user is who the user purports to be.

Embodiments of the present invention further recognize that users often find that authentication methods having high confidence levels are more burdensome (i.e., less convenient) than methods having lower confidence levels. For example, two-factor authentication can authenticate a user at a high confidence level. Generally, two-factor authentication requires that an enrolled user provide, as a first factor, an access control system with a username and password and present, as a second factor, a dynamically generated token that the access control system sends to the user via a method determined during the enrollment of the user (e.g., via email or text message). Users, however, often view the additional steps involved in retrieving the dynamically generated token, in some cases requiring the user to switch applications or windows within a graphical user interface (GUI), as representing a significant burden. The increased burden can disadvantageously decrease user participation and/or result in implementing an access control system having a lower confidence level.

Additionally, embodiments of the present invention recognize that the proliferation of high-resolution webcams and high-resolution smartphone cameras is enabling increased use of image-based biometric access control systems (e.g., facial-recognition algorithms). In some instances, a biometric feature represents the second factor in two-factor or other multi-factor authentication systems. In other instances, biometric feature(s) represent a sole factor in an authentication method. Embodiments of the present invention, however, recognize that the confidence level of image-based biometric authentication can vary significantly based on the specifications of the camera, camera settings, image composition, and environmental conditions, among other factors. For example, factors including resolution, contrast, brightness, distance, vibration, background composition, and obfuscation due to environmental conditions like rain and condensation can reduce the accuracy of facial-recognition algorithms and thus degrade the confidence level of the authentication. While a user may find it relatively easy to capture an image that is suitable for authentication at a low confidence level, the user may find it much more difficult to capture an image that is suitable for authentication at a higher confidence level because the acceptable variability with respect to one or more of the aforementioned factors is most likely much less. As a result, the user may have to make multiple attempts at capturing an acceptable image of the biometric feature before the user is granted access to protected resource(s). As recognized above, the user may perceive the additional attempts at authentication as an increased burden that may disadvantageously dissuade the user from utilizing such forms of biometric authentication, despite the benefits that they can provide. The user may, for example, opt-out of a high confidence level authentication method if the user perceives the method as being too much of a burden.

Accordingly, embodiments of the present invention provide a context-aware biometric access control system that dynamically adjusts authentication methods based, at least in part, on confidence levels that are associated with protected resources and facilitates coaching that can reduce the difficulty of capturing an acceptable biometric token. For example, an access control policy may identify a resource hierarchy that associates low-level resources with authentication methods having a low confidence level and that associates higher-level resources with authentication methods having higher confidence level(s). In one such example, the access control system manages electronic access to a financial institution's resources via the financial institution's website. While the access control policy grants a user entrance through an initial gateway portal upon authentication of the user's username and password, the policy partitions various elements of the website's functionality (i.e., resources) in accordance with the resource hierarchy. In one more specific example, the user is able to view account balances upon entry via the gateway portal, but the policy requires that the access control system re-authenticate the user via facial recognition before authorizing any account transactions; the policy requires that the access control system authenticate the user at a first confidence level for account transactions below a threshold dollar amount and at a second, higher confidence level for account transactions equal to or greater than the threshold dollar amount. To advantageously reduce the burden of re-authentication on the user, the access control system provides the user with image-capture coaching to increase the likelihood that a user's first attempt, and any additional attempts, at capturing an acceptable facial-recognition image will be successful.

Embodiments of the present invention will now be described in detail with reference to the Figures. It is to be understood that these embodiments are described only for the purpose of illustration and help those skilled in the art to understand and implement the present invention, without suggesting any limitation as to the scope of the invention. The invention described herein can be implemented in various manners other than the ones explicitly described herein. For example, elements of various embodiments of the present invention are illustrated with respect to facial-recognition authentication methods and transactions involving financial institutions, the invention described herein is not to be construed as being limited thereto. The inventions described herein is not limited to this authentication method and is not limited to these types of protected resources.

Figure 1:
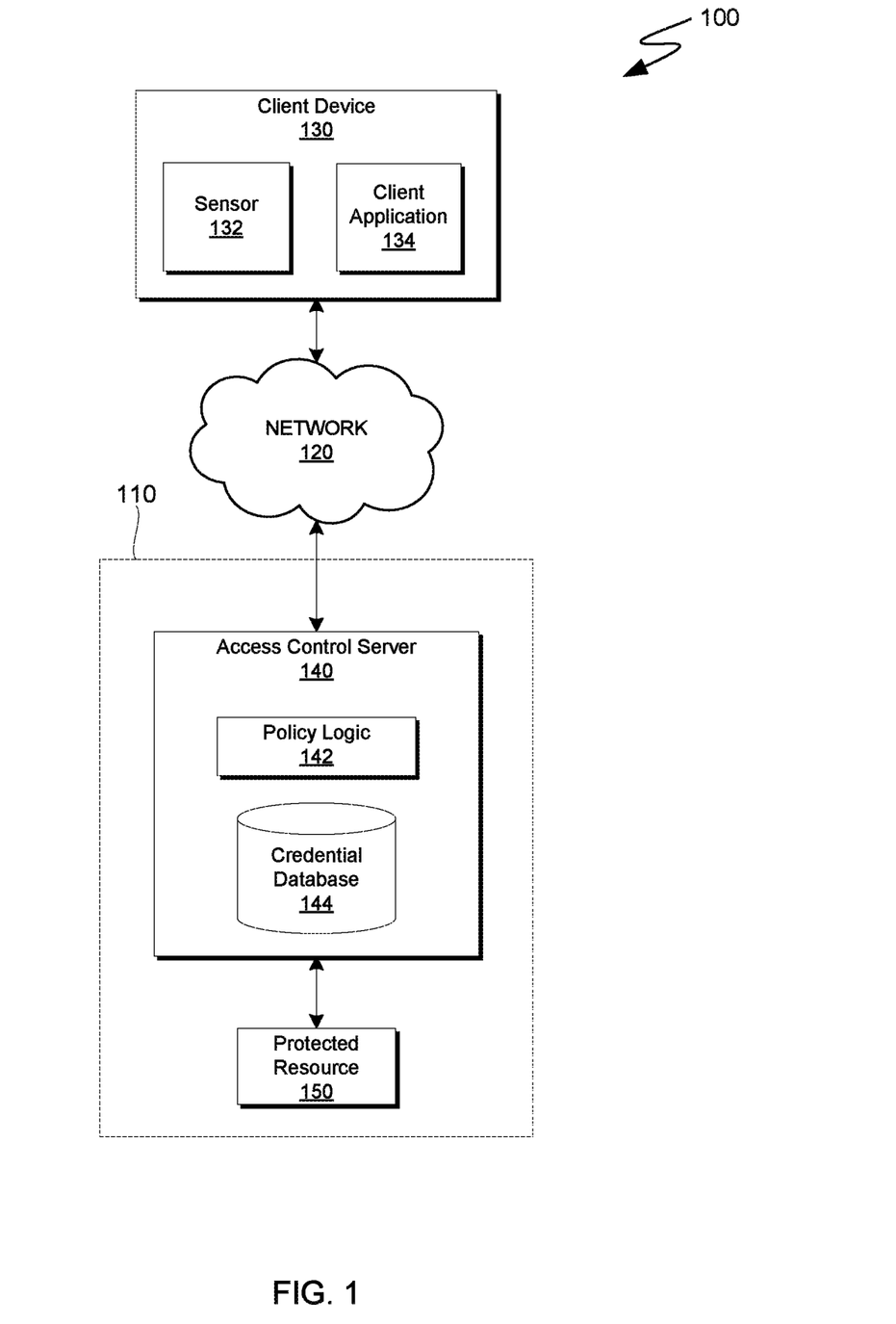
FIG. 1 is a functional block diagram illustrating a computing environment in which a context-aware biometric access control policy is utilized, in accordance with an embodiment of the present invention.

FIG. 1 is a functional block diagram illustrating a computing environment in which a context-aware biometric access control policy is utilized, in accordance with an embodiment of the present invention. For example, FIG. 1 is a functional block diagram illustrating computing environment 100 that includes client device 130 and system infrastructure 110, which are communicatively connected via network 120. System infrastructure 110 represents various elements of an information technology infrastructure of an entity or institution that utilizes context-aware biometric access control policies to manage access to protected resource(s). System infrastructure 110 includes access control server 140 that executes policy logic 142 to, at least in part, manage access to protected resource 150. System infrastructure 110 can include additional elements for provisioning and/or managing protected resource 150.

Protected resource 150 is depicted in FIG. 1 for illustrative simplicity, System infrastructure 110, however, can include any number of protected resources that are managed in accordance with policy logic 142. In general, protected resource 150 represents a physical or virtual resource to which the entity or institution represented by system infrastructure 110 wishes to manage access. In some embodiments, protected resource 150 represents information and policy logic 142 manages the ability to view the information. In other embodiments, protected resource 150 represents code that provides an ability to take a specific action with respect to another physical or virtual resource and policy logic 142 manages the ability to take such actions. In yet other embodiments, protected resource 150 represents control over a physical or virtual resource and policy logic 142 manages the ability to use and modify the resource. Protected resource can also represent any combination of the aforementioned elements. To illustrate various aspects of the present invention, examples in which protected resource 150 represents an account balance, a low value financial transaction, or a high value financial transaction, but embodiments of the present invention are not limited thereto.

Figure 4:
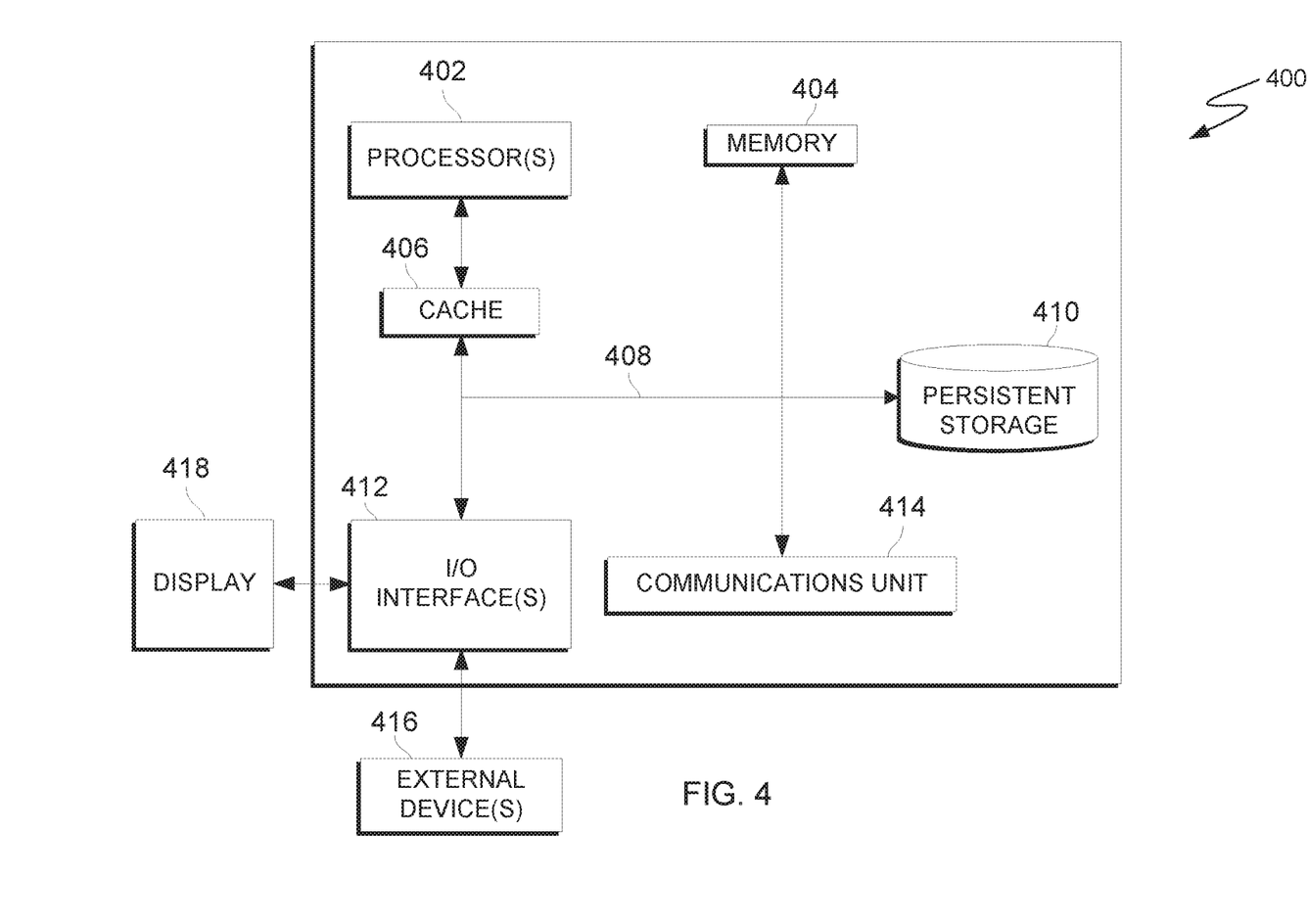
FIG. 4 is a block diagram of components of one or more computing devices within the computing environment depicted in FIG. 1, in accordance with an embodiment of the present invention.

In various embodiments, access control server 140 is a computing device that can be a standalone device, a server, a laptop computer, a tablet computer, a netbook computer, a personal computer (PC), or a desktop computer. In some embodiments, access control server 140 represents a computing system utilizing clustered computers and components to act as a single pool of seamless resources. In yet other embodiments, access control server 140 can be implemented on a cloud computing platform. In general, access control server 140 can be any computing device or a combination of devices that can execute policy logic 142 to manage access to protected resource 150 in response to requests received from client device 130. Access control server 140 can include internal and external hardware components as depicted in FIG. 4.

In the embodiment depicted in FIG. 1, policy logic 142 utilizes, at least in part, data stored in credential database 144 to manage access to protected resource 150 in response to access requests received from client device 130 (i.e., from user of client device 130, alternatively referred to herein as a "requestor"). More specifically, policy logic 142 defines a resource hierarchy that represents various authentication confidence levels and that associates low confidence levels with less valuable, sensitive, and/or important resources and higher confidence levels with more valuable, sensitive, and/or important resources. Protected resource 150 represents a protected resource with respect to a specific access request and can represent any resource governed by policy logic 142 in a respective, specific access request. Additionally, policy logic 142 operates to, at least in part, identify a confidence level that is associated with protected resource 150; if authentication of the requestor is required, identify any factors that affect the confidence level of a biometric token; and if any factors are identified, communicate the factors to client device 130 to facilitate coaching, as described herein. Upon receipt of a biometric token, policy logic 142 operates to, at least in part, determine if the requestor can be authenticated at the confidence level associated with protected resource 150 based on the received biometric token. If policy logic 142 can authenticate the requestor at the required confidence level, policy logic 142 operates to grant the requestor access to protected resource 150. If policy logic 142 cannot authenticate the requestor at the required confidence level, policy logic 142 operates to deny the requestor access to the protected resource, and in some embodiments, provide additional coaching that may enable policy logic 142 to authenticate the requestor at the required confidence level with respect to a subsequent biometric token.

In various embodiments, credential database 144 stores credentials for individuals and entities that are enrolled in policy logic 142. For example, credential database 144 can associate usernames, passwords, permissions, and various biometric features with enrolled individuals and entities as part of a user profile. Accordingly, the entity or institution represented by system infrastructure 110 may capture biometric features (e.g., fingerprints, iris scans, facial-recognition data, etc.) during an initial enrollment process. The user profile can also identify various authentication methods that the user selects. For example, one use may select facial recognition as a preferred authentication method while another user may select fingerprint recognition as a preferred authentication method when given a choice during or subsequent to the enrollment process. More generally, credential database 144 is a data repository that policy logic 142 can access to, among other things, authenticate a requestor utilizing data stored therein. In some embodiments, credential database 144 may be written to and read by programs and entities outside of computing environment 100 in order to populate the repository with credentials of enrolled individuals and entities. Additionally, credential database 144 may store one or more parameters of client device 130 and/or sensor 132 obtained via the enrollment process and/or previous requests to access protected resource 150.

In various embodiments, client device 130 represents, at least in part, an electronic device that can be a standalone device, a server, a laptop computer, a tablet computer, a netbook computer, a personal computer (PC), or a desktop computer. In general, client device 130 represents a computing device that can capture biometric tokens via sensor 132 and communicate with access control server 140 such that a user of client device 130 (i.e., a requestor) can request access to protected resource 150. Accordingly, client application 134 operates to transmit access requests to access control server 140 and configure client device 130 and/or present any feedback (i.e., coaching) that client device 130 receives from policy logic 142 in response to the access request. In some embodiments, client application 134 also represents one or more elements of policy logic 142. For example, client application 134 can include functionality for determining whether or not a biometric token satisfies a specified confidence level and coaching a user of client device 130, as described herein. Additionally, credential database 144 and protected resource 150 can reside on client device 130 in various embodiments of the present inventions (e.g., embodiments in which policy logic 142 controls access to one or more feature of client device 130). Client application 134 can also represent a user interface (UI) that operates to provide a UI (e.g., a graphical user interface (GUI)) to a user of client device 130. The user interface operates to receive user input from the user via the provided user interface, thereby enabling the user to interact with client application 134 executing on client device 130. The user interface and client application 134 can also operate to enable the user to access and/or interact with protected resource 150 following authentication of the user via policy logic 142. Computing environment 100 can include a different count of client device 130 without departing from the scope of the present invention.

In various embodiments, sensor 132 can represent a camera, a microphone, a fingerprint sensor, a hand sensor, or any other sensor that can generate a biometric token that represents a respective aspect of the user of client device 130. In one example, sensor 132 is a smartphone camera that is compatible with facial-recognition algorithms and that can generate an image of the face of the user of client device 130 (i.e., a biometric token) that can facilitate a high-value financial transaction by enabling policy logic 142 to re-authenticate the user at a high confidence level. In another example, sensor 132 represent a fingerprint scanner that is integrated into a screen of a smartphone and that similarly facilitates high-value financial transaction by enabling policy logic 142 to re-authenticate the user at a high confidence level. Client device 130 can include or communicate with any number and/or any type of sensor that can generate biometric tokens utilized by policy logic 142.

Figure 2:
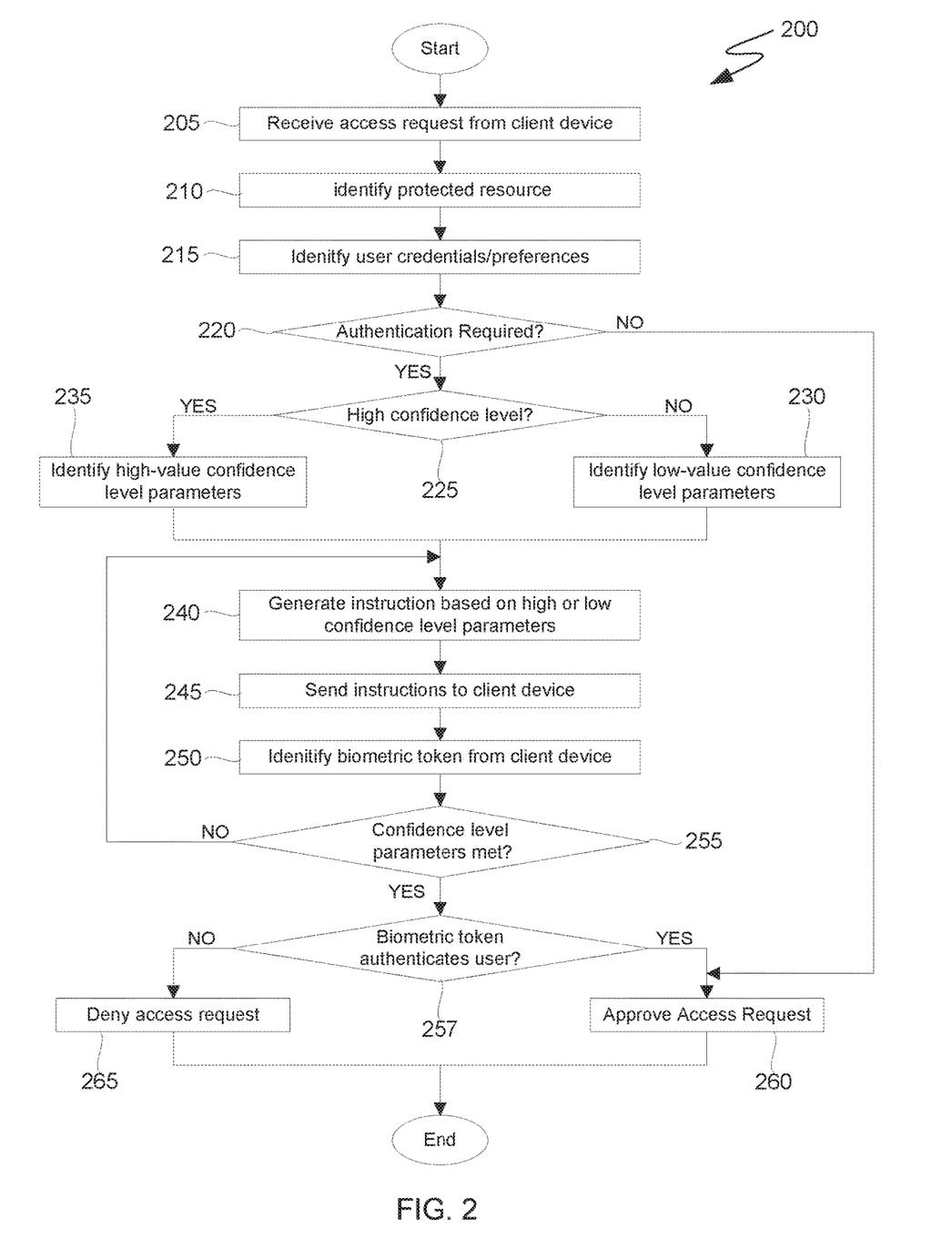
FIG. 2 is a flowchart depicting operations for executing a context-aware biometric access control policy within the computing environment depicted in FIG. 1, in accordance with an embodiment of the present disclosure.

FIG. 2 is a flowchart depicting operations for executing a context-aware biometric access control policy within the computing environment depicted in FIG. 1, in accordance with an embodiment of the present disclosure. More specifically, FIG. 2 depicts operations 200 of policy logic 142 executing on access control server 140 to manage access to protected resource 150. In some embodiments, however, operations 200 represent logical operations of client application 134, wherein interactions between policy logic 142 of access control server 140 and client application 134 and/or sensor 132 of client device 130 represent interactions between logical units executing on client device 130.

Upon receiving an access requests from a client device (i.e., from a user of client device 130; operation 205), policy logic 142 operates to identify the protected resource(s) for which access is requested (i.e., protected resource 150; operation 210) and identify any user credentials and/or preferences that are available via system infrastructure 110 (e.g., via credential database 144; operation 215). In some embodiments, the nature of the access request is based, at least in part, on the identity of the protected resource(s). If, for example, system infrastructure 110 represents infrastructure of a financial institution, an access request may be a request to view an account balance, update personal information (e.g., a user profile), transfer funds, or a utilize another service of the financial institution via a website or application (i.e., an "app" on a mobiles electronic device). Additionally, in some embodiments, policy logic 142 can be influenced or take into account one or more user preferences or an audit of a user's authentication history in operation 215 (e.g., a record of policy logic 142's authentications of the user during a period of time and/or "session"). For example, policy logic 142 may determine that the user was authenticated at a certain confidence level upon policy logic 142 granting the user entrance via a gateway portal (e.g., a website landing page that requires that the user provide a valid username and password to pass through the portal). In another example, policy logic 142 may determine that the user waived one or more security measures (e.g., re-authentication for one or more protected resources) via user-preferences selections. More generally, operation 215 represents policy logic 142 querying various elements of system infrastructure 110 to identify any factors that may affect subsequent decisions, as described herein.

Based one or more of the nature of the access request, the identity of the protected resource, and any relevant user credentials and/or user preferences, policy logic 142 determines whether or not policy logic 142 is to authenticate or re-authenticate the user (decision 220). In one example, policy logic 142 determines that authentication or re-authentication is not required (decision 220, NO branch) because the protected resource(s) do not require any authentication of the user. In another example, policy logic 142 determines that the user was authenticated upon passing through a gateway portal and that no re-authentication of the user is required (decision 220, NO branch). In one more specific example, policy logic 142 determines that policy logic 142 authenticated the user using the user's username and password upon granting the user entrance through a financial institution's landing page, and therefore, that re-authentication is not required because the access request, a request to view an account balance, does not require re-authentication. If policy logic 142 determines that policy logic 142 does not have to authenticate or re-authenticate the user to approve the received access request (decision 220, NO branch), policy logic approves the access request (operation 260), thereby granting the user access to the identified protected resources(s) (e.g., protected resource 150).

In other instances, however, policy logic 142 can determine that policy logic 142 is to authenticate or re-authenticate the user (decision 220, YES branch). For example, policy logic 142 can determine, based on a resource hierarchy, that access to one or more resources identified in the access request require that policy logic 142 authenticate the user at a higher confidence level than any previous authentication of the user (decision 220, YES branch). In one more specific example, policy logic 142 determines that policy logic 142 authenticated the user using the user's username and password upon granting the user entrance through a financial institution's landing page, but that the access request represents a request to transfer funds that requires policy logic 142 to authenticate (i.e., re-authenticate) the user using an authentication method having a higher confidence level (e.g., a biometric authentication method).

In the embodiment depicted in FIG. 2, policy logic 142 determines whether or not policy logic 142 is to authenticate or re-authenticate the user using a biometric authentication method at a high confidence level or a lower confidence level (decision 225). While FIG. 2 depicts decision 225 as a binary decision for illustrative simplicity, other embodiments are not limited to identifying one of two confidence levels. In other embodiments, decision 225 represents operations to identify an appropriate confidence level from among three or more confidence levels. Decision 225 can be based, at least in part, on a resource hierarchy that maps various protected resources within system infrastructure 110 to respective confidence levels for biometric authentication. In some embodiments, one or more protected resources are associated with a plurality of respective confidence levels, and an identification of an appropriate confidence level in response to a specific request to access a resource is based on one or more parameters of the specific request. For example, protected resource 150 can represent a request that a financial intuition transfer funds from a user account, wherein policy logic 142 selects an appropriate confidence level from among a plurality of confidence levels that are associated with such transfers based on the requested dollar amount. Additionally, in some embodiments, the type of electronic device represent by client device 130 determines or affects the identified confidence level. If, for example, client device 130 represent a mobile device, such as a smart phone, the resource hierarchy and/or policy logic 142 may determine that the appropriate confidence level is a high confidence level or should increase, but that the appropriate confidence level is a low confidence level or should decrease if client devices 130 represents a desktop computer. The way in which the identity of client device 130 affects the identified confidence level can be based on inferences as to the security of various types of electronic devices.

More generally, any combination of operations 205, 210, and 215 and decisions 220 and 225 represent logic for determining the "context" of a request to access a protected resource. Based on the context of the request, policy logic 142 provides the functionality subsequently described, at least in part.

For each confidence level for biometric authentication, policy logic 142 maps a set of parameters that can affect the ability of policy logic 142 to authenticate the user at the respective confidence level. Persons of ordinary skill in the art will understand that the set of parameters is based and dependent on the type of biometric authentication method. As previously stated, policy logic 142 can be configured to manage access to protected resource 150 using various biometric authentication methods, such as facial-recognition algorithms, fingerprint recognition algorithms, voice-recognition algorithms, and various other methods know to persons having ordinary skill in the art. Based on the confidence level identified in decision 225, policy logic 142 identifies any corresponding confidence level parameter(s) (operation 230 or 235). In the embodiment depicted in FIG. 2, for example, policy logic 142 identifies low-value confidence level parameter(s) (operation 230) in response to determining that policy logic 142 is to authenticate or re-authenticate the user using a biometric authentication method at a low confidence level (decision 225, NO branch). Conversely, policy logic 142 identifies high-value confidence level parameter(s) (operation 235) in response to determining that policy logic 142 is to authenticate or re-authenticate the user using a biometric authentication method at a high confidence level (decision 225, YES branch). Additionally, policy logic 142 generates instructions that describes the identified parameters (e.g., parameters identified in operation 230 or 235) and/or how to configure client device 130 and/or sensor 132 to increase the likelihood that the user will generate a biometric token that facilitates authentication at the confidence level identified in decision 225.

In one specific example, policy logic 142 determining whether or not policy logic 142 is to authenticate or re-authenticate the user using a biometric authentication method at a high confidence level or a lower confidence level (decision 225), represents logic executed in response to determining that policy logic 142 authenticated the user using the user's username and password upon granting the user entrance through a financial institution's landing page, but that the access request represents a request to transfer funds that requires policy logic 142 to authenticate (i.e., re-authenticate) the user using a biometric authentication method capable of authenticating individuals at two different confidence levels (decision 220, YES branch). To determine which of the two confidence levels that policy logic 142 is to use (decision 225), policy logic determines whether or not a dollar amount of the requested transfer of funds exceeds a threshold dollar amount. If policy logic 142 determines that the dollar amount is below the threshold dollar amount (i.e., a low-value transaction), policy logic 142 determines that facial-recognition authentication at a low confidence level is acceptable (decision 225, NO branch) and identifies low-value confidence level parameters for facial-recognition authentication (operation 230). If policy logic 142 determines that the dollar amount is equal to or greater than the threshold dollar amount (i.e., a high-value transaction), policy logic 142 determines that facial-recognition authentication at a high confidence level is required (decision 225, YES branch) and identifies high-value confidence level parameters for racial-recognition authentication (operation 230). In other examples of this type, policy logic 142 specifies multiple threshold dollar amounts and a corresponding number of sets of confidence level parameter (e.g., low and high threshold dollar amounts and low, medium, and high-value sets of confidence level parameters). Additionally, in some embodiments, policy logic 142 utilizes more than one type of biometric authentication method and/or a combination of biometric authentication methods and non-biometric authentication methods to authenticate or re-authenticate the user. Accordingly, decision 225 and/or operations 230 and 235 can represent operations to identify the requisite authentication methods.

For example, in embodiments that utilize facial-recognition authentication methods, sets of confidence level parameters can include photographic variables that can affect the ability of facial-recognition algorithms to correctly identify facial features. Low-value confidence level parameters specify a first set of values for these variables and high-value confidence level parameters specify a second set of values for these variables. Examples of such photographic variables include white balance, focal length, resolution, vibrations (i.e., hertz), light sensitivity (i.e., ISO), as well as other variables recognized by persons having ordinary skill in the art. For example, a set of high-value confidence level parameters may specify a white balance of greater than 5,000 kelvin, a focal length of one meter, a resolution of eight megapixels, vibrations no greater than three centimeters in amplitude (and/or a first frequency value in hertz), and an ISO value of 400 while a set of low-value confidence level parameters may specify a white balance of greater than 1,500 kelvin, a focal length of two meters, a resolution of five megapixels, vibration no greater than five centimeters in amplitude (and/or a second, higher frequency value in hertz), and an ISO value of 100. Confidence level parameters for other biometric authentication methods (e.g., fingerprint recognition, voice recognition, etc.) can similarly represent different values for a set of respective variables.

Based, at least in part, on the identified authentication method(s) and the identified confidence level parameters, policy logic 142 generates instruction(s) that describe, at least in part, how to capture one or more biometric tokens (operation 240). In some embodiments, one or more instructions represent a request to an application program interface (API) of client device 130 and/or client application 134 to configure client device 130 and/or sensor 132 in accordance with one or more corresponding confidence level parameters. If, for example, the confidence level parameters identify, among other things, camera settings to use in capturing a facial recognition biometric token (e.g., a focal length, resolution, and ISO values to use in capturing a photo of the user's face), the instructions can represent a request that client application configure settings for a camera of client device 130 (i.e., sensor 132) accordingly. And in some embodiments, one or more instructions represent a request that a GUI of client application 134 present to the user of client device 130 a human-comprehensible description of recommended conditions for capturing the biometric token in accordance with one or more corresponding confidence level parameters, referred to as "coaching" herein. For example, the instructions could represent a request that the GUI of client application 134 present a prompt that requests that the user of client device 130 manually configure the camera of client device 130 (i.e., sensor 132) in accordance with the settings noted above. Additionally, if the confidence level parameters identify, among other things, a white balance (e.g., a degree of "warmth" or "coolness" of a light source) and a maximum level of vibrations, the instructions can represent a request that client application 134 indicate or describe these parameters in a human-comprehensible way. In one example, the instructions instruct the GUI of client application 134 to present an example of a recommended white balance by modulating the output of a screen of client device 130 and present an animation that is representative of the maximum level of vibration on the screen of client device 130. Policy logic sends the generated instructions to client device 130 (operation 245).

If the user of client device 130 elects to proceed with the authentication or re-authentication process, policy logic identifies any biometric tokens, and/or any other type of authentication token, received from client device 130 in accordance with the identified authentication methods (operation 250). Policy logic 142 analyzes the received token(s) and determines whether or not the tokens meet the identified confidence level (decision 255). If the received token(s) meet the identified confidence level (decision 255, YES branch), policy logic 142 determines whether or not the received token(s) authenticate the user of client device 130 based, at least in part, on the user's credentials stored in credential database 144 (decision 257). If the received token(s) do not meet the identified confidence level (decision 255, NO branch), policy logic 142 generates and sends instructions (additional iterations of operations 240 and 245) that describe how to correct any deficiencies (e.g., unsatisfied confidence level parameters) in the received token(s) identified in determining whether or not the received token(s) met the confidence level. If the user of client device 130 elects to continue with authentication or re-authentication process and generate updated token(s), policy logic identifies the updated token(s) and determines if the updated token(s) meet the identified confidence level (additional iterations of operation 250 and decision 255).

In one example, policy logic 142 identifies an image of the user's face received from client device in order to authenticate the user of client device 130 via a facial-recognition algorithm (operation 255). With respect to some confidence level parameters, policy logic 142 can evaluate whether or not the image (i.e., a biometric token) meets such confidence level parameters. For example, policy logic 142 can measure the color at one or more points in the image to determine if the image satisfies a white balance parameter. Additionally, the image may include metadata that identifies camera setting(s) that were used to capture the image and/or one or more properties of the image that policy logic 142 can use to determine whether or not the image satisfies the identified confidence level parameters. With respect to other confidence level parameters, policy logic 142 can evaluate whether or not the image meets such confidence level parameters based on one or more outputs of the facial-recognition algorithm. For example, the facial-recognition algorithm may output an error if it cannot identify one or more features of the user's face due to blurriness of the image (e.g., due to excessive vibration or moisture on the camera lens during capture of the image). In another example, the facial-recognition algorithm indicates that it cannot make a determination at the identified confidence level using the received image. With respect to any confidence level parameters that are not met, policy logic resends the corresponding instructions that were previously sent and/or sends updated instructions requesting that the GUI of client application 134 coach the user of client device 130 in capturing a subsequent image by providing human-comprehensible suggestions based on one or more of the unsatisfied confidence level parameters. For example, resent instructions may request that an API of client device 130 and/or client application 134, or the user of client device 130, change one or more camera settings that were incorrectly set during capture of the initial image. In another example, updated instructions represents suggestions that the user move to a brighter environment, hold client device 130 with greater stability, move to a drier environment, and/or wipe condensation off the camera lens when capturing an updated image (i.e., an updated biometric token). In some instances, policy logic 142 requests that the user of client device capture an updated biometric token without including more detailed instructions. For example, a facial-recognition may not be able to authenticate the user at the applicable confidence level for unknown reasons. Coaching the user of client device 130, however, may advantageously reduce the number of attempts before a suitable image is obtained, which can advantageously increase user participation in and/or utilization of more secure authentication methods that users may otherwise perceive as being overly burdensome.

In some embodiments, policy logic 142 reverts to alternative authentication methods after a threshold number of unsuccessful attempts to capture a suitable biometric token. Policy logic 142 can select alternative authentication methods based on a hierarchy of authentication methods and/or user preferences recorded in credentials database 144. In one example, policy logic 142 reverts to an alternative biometric authentication method, such as fingerprint recognition, following three unsuccessful attempts to capture an image of the user's face that satisfies the confidence level parameters. In another example, policy logic 142 dynamically generates a digital token and provides the dynamically generated token to the purported, enrolled user via a method specified during the purported user's enrollment process following three unsuccessful attempts to capture an image of the user's face that satisfies the applicable confidence level. In other embodiments, policy logic 142 sends an error message and request that the user try again at a different time in response to a threshold number of unsuccessful attempts to generate a suitable biometric token.

If policy logic 142 determines that the initial token(s) and/or one or more updated token(s) authenticate the user of client device 130 (decision 257, YES branch), policy logic 142 approves the access request and grants client device 130 access to protected resource 150 (operation 260). If policy logic 142 determines that the initial token(s) and/or one or more updated token(s) do not authenticate the user of client device 130 (decision 257, NO branch), policy logic 142 denies the access request and notifies client device 130 of the decision (operation 265). If, for example, policy logic 142 determines that an image of the user's face authenticates the user at the high confidence level, policy logic 142 approves the high-value transfer of funds previously discussed (operation 260). If, however, policy logic 142 determines that the image of the user's face does not authenticate the user at the high confidence level, policy logic 142 denies the high-value transfer of funds and sends an error message to client device 130 (operation 265).

Figure 3:
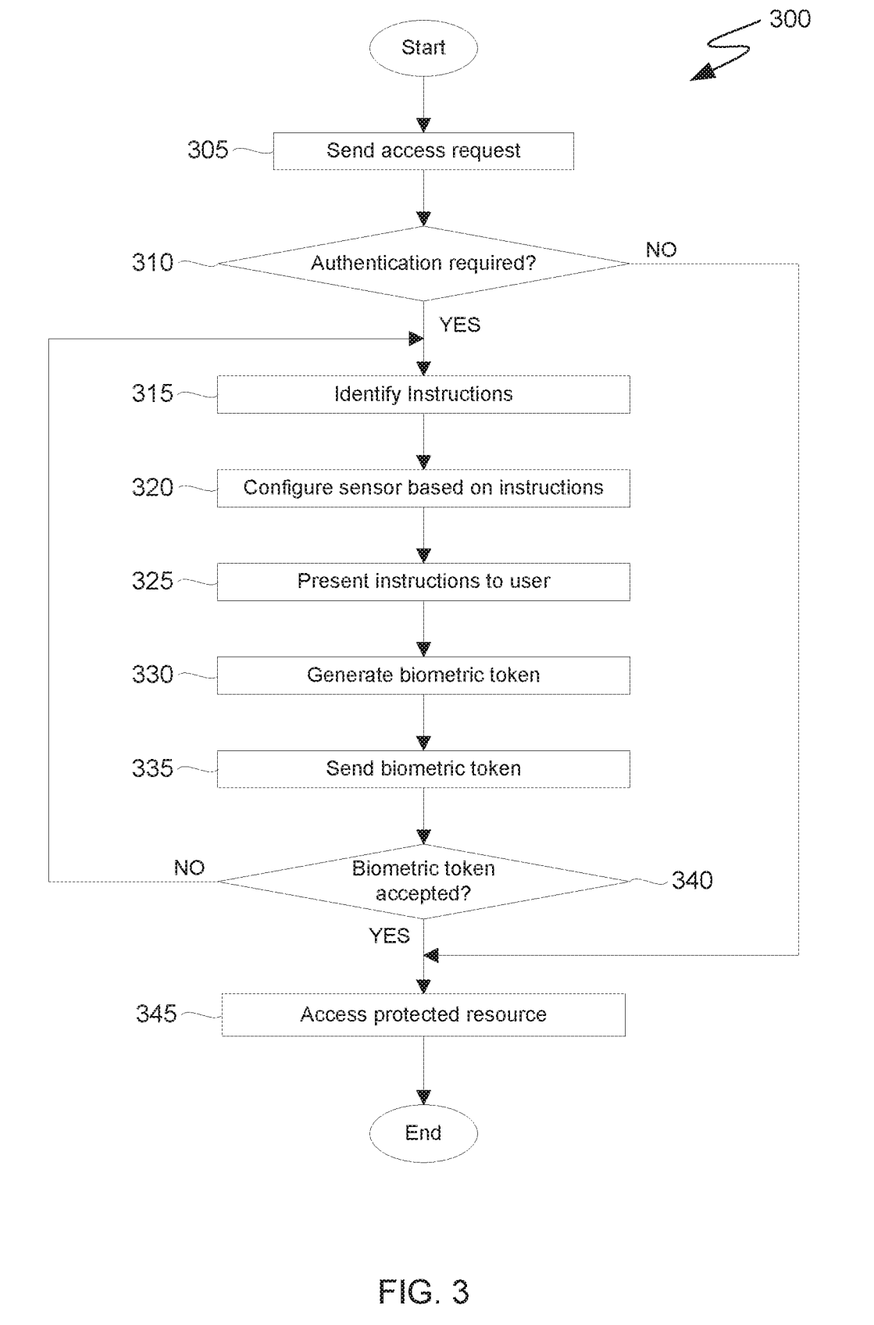
FIG. 3 is a flowchart depicting operations for executing operations on requesting access to a protected resource within the computing environment depicted in FIG. 1, in accordance with an embodiment of the present invention.

FIG. 3 is a flowchart depicting operations for executing operations on requesting access to a protected resource within the computing environment depicted in FIG. 1, in accordance with an embodiment of the present invention. More specifically, FIG. 3 is a flowchart depicting operations 300 of client application 134 executing operations on client device 130 to access protected resource 150. Operations 300 represent logical operations of client application 134 that interact with and influence operations 200 of policy logic 142, as depicted in FIG. 2. In some embodiments, operations 300 can include one or more elements of operations 200, in which case interactions between operations 200 and 300 represent logic of client application 134.

When a user of client application attempts to access protected resource 150 within system infrastructure 110, client application 134 sends an access request to policy logic 142 executing on access control server 140 (operation 305). If policy logic 142 does not need to authenticate or re-authenticate the user of client device 130 to approve the access request (decision 310, NO branch), client application 134 is able to access protected resource 150. In one example, the user does not need to authenticate or re-authenticate the user's identity when the user asks client application 134 to present an account balance if policy logic 142 authenticated the user via the user's username and password to permit client application 134 access beyond a landing page of a financial institutions website. If policy logic 142 must authenticate or re-authenticate the user of client device 130 to approve the access request (decision 310, YES branch), client application 134 identifies any instructions received from policy logic 142 (operation 315).

Based on the instructions received from policy logic 142, client application 134 configures client device 130 and/or sensor 132 in accordance with one or more of the instructions to capture a biometric token (operation 320) and/or presents one or more of the instructions to capture a biometric token in a human-comprehensible way via a GUI of client application 134 (operation 325). In one example, client application 134 adjusts a focal length setting, a resolution setting, and an ISO setting of a camera of client device 130 (i.e., sensor 132) to satisfy respective confidence level parameters based on the received instructions, as discussed with respect to FIG. 2. In another example, client application 134 presents an example of a recommend white balance and an animation depicting a maximum allowable degree of vibration based on the received instructions in order to increase the likelihood that the user will capture an image that satisfies a respective confidence level, as similarly discussed with respect to FIG. 2. If the user of client device 130 elects to proceed with the authentication or re-authentication of the user, client device 130 generates one or more biometric and/or non-biometric tokens (operation 330) and sends the generated token(s) to policy logic 142 executing on access control server 140, as discussed with respect to FIG. 2.

If client application 134 determines that policy logic 142 determined that the generated token(s) satisfy applicable confidence level and that the generated token(s) authenticated the user of client device 130, as discussed with respect to FIG. 2 (decision 340, YES branch), client application 134 accesses protected resource 150. In one example, a GUI of client application 134 presents an account balance. In another example, operation 345 represents an approval from policy logic 142 to transfer funds. If policy logic 142 determines that policy logic 142 determined that the generated token(s) did not satisfy the applicable confidence level (decision 340, NO branch), client application 134 proceeds through subsequent iterations of operations 315, 320, 330, and 335 and decision 340 with respect to generating one or more updated token(s) in order to generate token(s) that satisfy the applicable confidence level, as discussed with respect to FIG. 2. For example, client application 134 may configure client device 130 and/or sensor 132, in accordance with one or more of the instructions based on one or more unsatisfied confidence level parameters. Client application 134 may also present one or more of the instructions to capture a biometric token in a human-comprehensible way based on one or more unsatisfied confidence level parameters. For example, a GUI of client application 134 may coach the user of client device 130 by presenting suggestions that the user move closer to a camera of the client device 130 (i.e., sensor 132), move to a more brightly lit environments, hold client device 130 and/or the camera in a more stable manner, move to a drier environments, and/or remove any condensation on the camera lens to increase the likelihood that a subsequently generated image of the user's face (i.e., a subsequent biometric token) will satisfy the applicable confidence level. Coaching the user of client device 130 in this way may advantageously reduce the number of attempts before a suitable image is obtained, which can advantageously increase user participation in and/or utilization of more secure authentication methods that users may otherwise perceive as being overly burdensome.

FIG. 4 is a block diagram of components of one or more computing devices within the computing environment depicted in FIG. 1, in accordance with an embodiment of the present invention. More specifically, FIG. 4 depict components of computing system 400 which, in various embodiments, is representative of one or both of access control server 140 and client device 130 within computing environment 100 of FIG. 1 and any logical components executing thereon.

Computing system 400 includes processor(s) 402, cache 406, memory 404, persistent storage 410, input/output (I/O) interface(s) 412, communications unit 414, and communications fabric 408. Communications fabric 408 provides communications between cache 406, memory 404, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computer system 400. For example, I/O interface(s) 412 may provide a connection to external device(s) 416 such as a keyboard, keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for executing a context-aware biometric access control policy, the computer program product comprising:

a computer readable storage medium and program instructions stored on the computer readable storage medium, the program instructions comprising:

program instructions to identify a request to access a protected resource of a plurality of protected resources, wherein the request is received from a client device;

program instructions to identify a confidence level that is associated with the protected resource based, at least in part, on a resource hierarchy, wherein the resource hierarchy associates each of the plurality of protected resources with one or more respective confidence levels for authentication;

program instructions to generate instructions to capture a biometric token via the client device based, at least in part, on a set of one or more confidence level parameters that is associated with the identified confidence level, wherein one or more confidence level parameters in the generated instructions require a new configuration of device settings of the client device to capture the biometric token according to the identified confidence level;

program instructions to send the generated instructions to the client device;

program instructions to provide a human-comprehensible suggestion to the client device of a user, in response to the biometric token not meeting the identified confidence level;

receiving a first biometric token from the client device;

program instructions to determine that the first biometric token does not authenticate the user of the client device to the identified confidence level;

program instructions to generate updated instructions that identify one or more unsatisfied confidence level parameters in response to identifying the one or more unsatisfied confidence level parameters with respect to the first biometric token;

program instructions to send the updated instructions to the client device; and program instructions to determine that a second biometric token received from the client device authenticates the user of the client device to the identified confidence level;

wherein the program instructions to determine that the first biometric token does not authenticate the user of the client device to the identified confidence level comprise program instructions to determine that a facial-recognition algorithm cannot authenticate an image of a face of the user of the client device to the identified confidence level;

wherein the program instructions to generate updated instructions that identify the one or more unsatisfied confidence level parameters comprise program instructions to generate an instruction that a user interface of the client device present one or more suggestions that identify the one or more unsatisfied confidence level parameters;

wherein the program instructions to generate instructions to capture a biometric token via the client device based, at least in part, on a set of one or more confidence level parameters that is associated with the identified confidence level comprise, program instructions to generate an instruction to an application program interface of the client device that one or more settings of a camera used to capture the image of the face of the user of the client device be configured in accordance with camera settings specified by the one or more confidence level parameters;

wherein the resource hierarchy associates a first confidence level and a second confidence level with the protected resource and the identified confidence level is identified based on a magnitude of a parameter of the request to access the protected resource;

wherein a first set of one or more confidence level parameters is associated with the first confidence level and a second set of one or more confidence level parameters is associated with the second confidence level;

wherein the first set of one or more confidence level parameters specifies a first set of camera settings and the second set of one or more confidence level parameters specifies a second set of camera settings, wherein the first set of camera settings and the second set of camera settings specify respective magnitudes at which to set corresponding camera setting types; and wherein the identified confidence level is associated with the first set of one or more confidence level parameters and the first set of camera settings.

2. The computer program product of claim 1, wherein the program instructions to generate instructions to capture a biometric token via the client device based, at least in part, on a set of one or more confidence level parameters that is associated with the identified confidence level further comprise:

program instructions to generate an instruction to an application program interface of the client device that one or more setting of a sensor used to capture the biometric token be configured in accordance with the one or more confidence level parameters.

3. The computer program product of claim 1, the program instructions further comprising:

program instructions to identify a threshold magnitude for the parameter of the request that is associated with the first confidence level and the second confidence level, wherein the first confidence level is identified when the magnitude of the parameter is greater than or equal to the threshold magnitude and the second confidence level is identified when the magnitude of the parameter is less than the threshold magnitude.

4. A computer system for executing a context-aware biometric access control policy, the computer system comprising:
one or more computer processors;
one or more computer readable storage media;
program instructions stored on the one or more computer readable storage media for execution by at least one of the one or more processors, the program instructions comprising:
program instructions to identify a request to access a protected resource of a plurality of protected resources, wherein the request is received from a client device;
program instructions to identify a confidence level that is associated with the protected resource based, at least in part, on a resource hierarchy, wherein the resource hierarchy associates each of the plurality of protected resources with one or more respective confidence levels for authentication;
program instructions to generate instructions to capture a biometric token via the client device based, at least in part, on a set of one or more confidence level parameters that is associated with the identified confidence level, wherein one or more confidence level parameters in the generated instructions require a new configuration of device settings of the client device to capture the biometric token according to the identified confidence level;
program instructions to send the generated instructions to the client device;
program instructions to approve the request to access the protected resource in response to determining when a biometric token received from the client device meets the identified confidence level; and
program instructions to provide a human-comprehensible suggestion to the client device of a user, in response to the biometric token not meeting the identified confidence level;
receiving a first biometric token from the client device;
program instructions to determine that the first biometric token does not authenticate the user of the client device to the identified confidence level;
program instructions to generate updated instructions that identify one or more unsatisfied confidence level parameters in response to identifying the one or more unsatisfied confidence level parameters with respect to the first biometric token;
program instructions to send the updated instructions to the client device; and
program instructions to determine that a second biometric token received from the client device authenticates the user of the client device to the identified confidence level;
wherein the program instructions to determine that the first biometric token does not authenticate the user of the client device to the identified confidence level comprise program instructions to determine that a facial-recognition algorithm cannot authenticate an image of a face of the user of the client device to the identified confidence level;
wherein the program instructions to generate updated instructions that identify the one or more unsatisfied confidence level parameters comprise program instructions to generate an instruction that a user interface of the client device present one or more suggestions that identify the one or more unsatisfied confidence level parameters;
wherein the program instructions to generate instructions to capture a biometric token via the client device based, at least in part, on a set of one or more confidence level parameters that is associated with the identified confidence level comprise, program instructions to generate an instruction to an application program interface of the client device that one or more settings of a camera used to capture the image of the face of the user of the client device be configured in accordance with camera settings specified by the one or more confidence level parameters;
wherein the resource hierarchy associates a first confidence level and a second confidence level with the protected resource and the identified confidence level is identified based on a magnitude of a parameter of the request to access the protected resource;
wherein a first set of one or more confidence level parameters is associated with the first confidence level and a second set of one or more confidence level parameters is associated with the second confidence level;
wherein the first set of one or more confidence level parameters specifies a first set of camera settings and the second set of one or more confidence level parameters specifies a second set of camera settings, wherein the first set of camera settings and the second set of camera settings specify respective magnitudes at which to set corresponding camera setting types; and
wherein the identified confidence level is associated with the first set of one or more confidence level parameters and the first set of camera settings.

5. The computer system of claim 4, the program instructions further comprising:
program instructions to identify a threshold magnitude for the parameter of the request that is associated with the first confidence level and the second confidence level, wherein the first confidence level is identified when the magnitude of the parameter is greater than or equal to the threshold magnitude and the second confidence level is identified when the magnitude of the parameter is less than the threshold magnitude.

6. The computer program product of claim 1, further comprising:
program instructions to authenticate the user of the client device using the received biometric token based, at least in part, on user credentials stored in a credential database, in response to the biometric token received from the client device meeting the identified confidence level.

7. The computer program product of claim 1, further comprising:
program instructions to approve the request to access the protected resource, in response to the biometric token authenticating the user.

8. The computer system of claim 4, further comprising:
program instructions to authenticate the user of the client device using the received biometric token based, at least in part, on user credentials stored in a credential database, in response to the biometric token received from the client device meeting the identified confidence level.

9. The computer system of claim 4, further comprising:
program instructions to approve the request to access the protected resource, in response to the biometric token authenticating the user.

* * * * *